United States Patent [19]

Huber

[11] Patent Number: 4,523,188

[45] Date of Patent: Jun. 11, 1985

[54] AUTOMATED MAP AND DISPLAY ALIGNMENT

[75] Inventor: William A. Huber, Sea Girt, N.J.

[73] Assignee: The United States of America as represented by the Secretary of the Army, Washington, D.C.

[21] Appl. No.: 436,249

[22] Filed: Oct. 25, 1982

[51] Int. Cl.³ .............................................. G09G 1/00
[52] U.S. Cl. ................................... 340/734; 340/724; 340/995
[58] Field of Search ............... 340/724, 734, 716, 728, 340/741, 990, 995; 356/150, 153, 154, 396, 397; 358/103; 324/208

[56] References Cited

U.S. PATENT DOCUMENTS 3,809,395 5/1974 Allison, Jr. et al. ................ 340/734
3,995,269 11/1976 Schumecher ....................... 340/724
4,295,135 10/1981 Sukonick ............................ 340/734
4,302,755 11/1981 Pisani et al. ........................ 340/734

Primary Examiner—Gerald L. Brigance
Attorney, Agent, or Firm—Anthony T. Lane; Jeremtah G. Murray; Robert A. Maikis

[57] ABSTRACT

Apparatus and a method are shown for automatically aligning a map with fixed topographic and other features therein with an underlying display on which appear electronically produced symbols which must register with the map features. The misalignment of the map is automatically sensed and measured and the positions of all of the display symbols are shifted by an amount equal to the map's misalignment, so that the map and the display information are brought into proper registration.

6 Claims, 4 Drawing Figures

AUTOMATED MAP AND DISPLAY ALIGNMENT

The invention described herein may be manufactured, used, and licensed by or for the Government for governmental purposes without the payment to me of any royalties.

BACKGROUND OF THE INVENTION

Military display applications often require that an overlay map be placed over and aligned with an electronic display so that the map features are superimposed on the underlying electronically produced display. The map for example may comprise topographic and other fixed features such as roads and cities while the electronic display may comprise variable tactical military information such as the location of troops and military equipment. This military information may be obtained from a computer and displayed on an electronic device such as a cathode ray tube in the form of symbols. The overlay map must be properly aligned with the cathode ray tube if the electronic display symbols are to be properly located with respect to the map features. One way to accomplish this alignment is by manual adjustment, however this can be time consuming and is subject to human error which can have serious consequences in tactical military operations. The present invention comprises a method and apparatus for accomplishing this alignment automatically. The overlay map is placed over the electronic display in approximate alignment therewith and apparatus and circuitry are provided to sense the map misalignment in both translation and rotation. Error signals are derived related to this misalignment and are applied to the circuitry which generates the electronic display to align the display with the misaligned map so that the two are in proper registration.

SUMMARY OF THE INVENTION

The maps have a wide border on all four sides and a circle is printed in magnetic or metallic ink on the border concentric with the center of the map. The cathode ray tube on which the display appears has linear arrays of sensors arranged orthogonally along its extended x and y axes. The sensor arrays automatically sense the position of the circle relative to the origin of the coordinate system and hence also relative to the cathode ray tube, and thus determine the translational error or misalignment. In addition to the circle, the map border has two mirror-image sections of two spirals printed adjacent the circle along the right and left (or positive and negative x-axis) sensor arrays for the purpose of determining the rotational component of misalignment. The circle is chosen because it will accurately indicate translational error in the presence of rotational error and the two spiral sections are necessary so that rotational error can be measured in the presence of translational error.

Circuitry is provided to measure at which four points the circle intercepts the sensor arrays and also the number of sensors (and hence the distance) between each spiral section and the adjacent portion of the circle. This information can be used to calculate the translational and rotational error. Signals proportional to these two errors are used to translate the coordinates of symbols to be displayed so that the displayed positions thereof register with the misaligned map.

It is thus an object of this invention to provide an automatic alignment method and apparatus for maps intended to overlay and register with electronic displays.

Another object of the invention is to provide a method for sensing translational error or misalignment of two objects which will function accurately in the presence of rotational error and which also accurately sense rotational error in the presence of translational error.

A further object is to provide circuitry and apparatus which is capable of sensing both translational and rotational error in the position of a map or like device which overlays an electronic display and which circuitry includes means to shift the electronic display to match the position of said map by utilizing said translational and rotational errors.

These and other objects and advantages of the invention will become apparent from the following detailed description and the drawings.

DETAILED DESCRIPTION OF A PREFERRED EMBODIMENT

Figure 1:
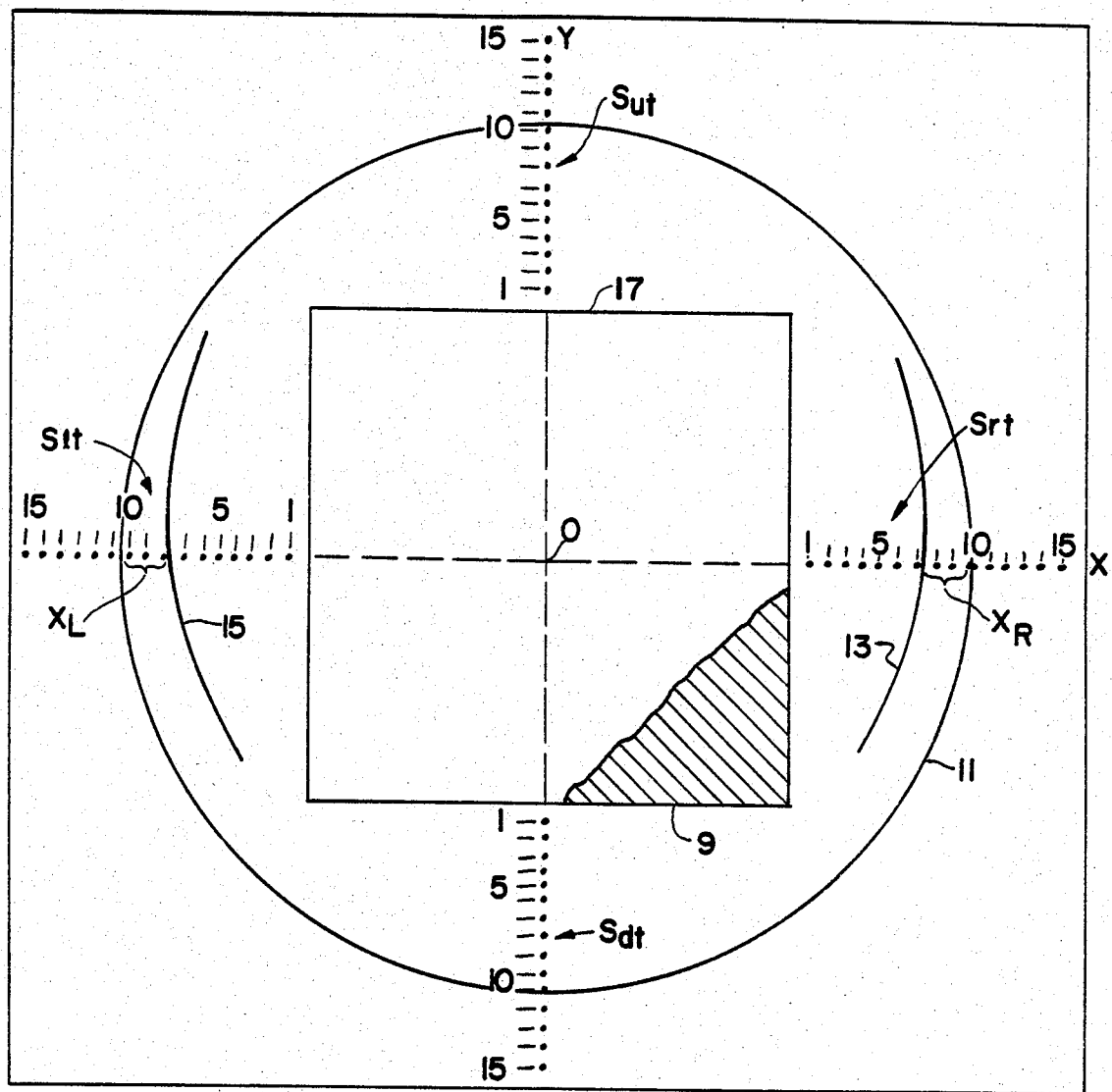
FIG. 1 is a front view of a map overlying an electronic display in accordance with the invention.

FIG. 1 shows a map 5 which includes a central square 17 adapted to include topographic and other fixed features (not shown), as explained above, and wide margins comprising all of the area outside the square. Printed on the underside of the map, in the margin thereof, is a circle 11 which is concentric with the center of the map, O. The lower right section of the map area 17 is broken away to show the underlying electronic display 9, which may comprise the face of a cathode ray tube. The map and the display 9 are shown in FIG. 1 as perfectly aligned in both translation and rotation. An array of sensors extends along the extended x and y axes of display 9, and may be supported by suitable means attached to the cathode ray tube. Thus the sensor arrays are fixed relative to the cathode ray tube or display 9. Four such arrays are shown. The array $S_{rt}$ represents the right or positive x-axis sensors, the array $S_{lt}$ the left or negative x-axis sensors, array $S_{ut}$ the upper or positive y axis sensors and $S_{dt}$ the down or negative y axis sensors. The circle 11 is printed in a material capable of being sensed or read by each of the evenly spaced sensors of these four arrays. For example, the circle may be printed with machine-readable magnetic or metallic ink.

A pair of mirror-image spiral sections 13 and 15 are disposed as shown inside the circle 11 and extend across the positive and negative x-axes, respectively. These are also printed in machine-readable ink. The ratio of the distances $X_R/X_L$ between the circle and the spirals along the right and left arrays determines the rotational error. With the map and display aligned as shown in FIG. 1, there are three sensors between the circle and each spiral and hence the ratio $X_R/X_L$ is unity, indicating no rotational error. It can be seen that rotation of the map in the clockwise direction will decrease $X_R$ and increase $X_L$, thus ratios less than one indicate clockwise rotational misalignment. Also, it can be seen that counterclockwise rotation will result in ratios greater than one. Use of the pair of mirror-image Archemedian spirals is necessary to obtain accurate rotational error measurement in the presence of translational error. For example if the map 5 in FIG. 1 were moved directly upward along the y-axis, the distance $X_R$ would increase due to the divergence of the spiral section 13 with the circle while the distance $X_L$ would also increase by the same amount since the spiral section 15 also diverges from the circle below the negative x-axis, in the same manner since the spirals are mirror images of each other. Thus the ratio of these two distances, $X_R/X_L$ will remain constant as the map translates up and down. Also, if the map translates directly to the right or left along the x-axes, both these distances will remain constant and hence the ratio of them will be unchanged. Since spiral section 15 increases its radius as its radius vector rotates clockwise, it can be considered a clockwise spiral section and by like reasoning, section 13 can be considered a counterclockwise spiral section.

Figure 2:
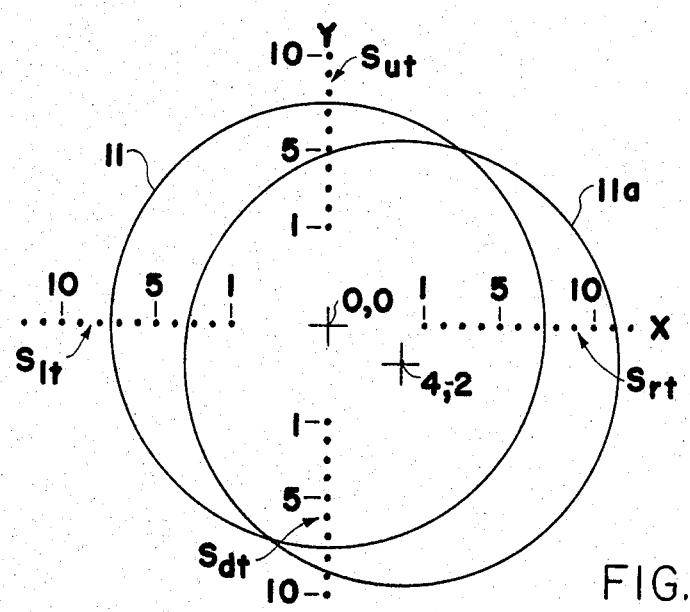
FIG. 2 is a diagram showing a map misaligned in translation and showing how the apparatus senses this misalignment.

FIG. 2 shows the map circle 11 of a centered or perfectly aligned map and also a map circle 11a of a map which has a translational error. The circle 11 is centered on the origin of the coordinates 0,0, as in FIG. 1, while the translated circle 11a is centered at coordinates 4 and −2, indicating a translational error of 4 units or four sensors to the right and 2 units or sensors down. It can be seen that the circle 11 intersects all of the sensor arrays at sensor 7, while the translated circle 11a intersects array $S_{rt}$ at sensor 11 and array $S_{lt}$ at sensor 3. Thus the x coordinate of the center of the translated circle is halfway between these intercepts. Mathematically this center coordinate is expressed as:

$$x = \frac{S_{rt} - S_{lt}}{2} \qquad \text{Eq. (1)}$$

In the case illustrated, x=4. Similarly the y coordinate of circle 11a is:

$$y = \frac{S_{ut} - S_{dt}}{2} \qquad \text{Eq. (2)}$$

In this case $S_{ut}$ equals 5 and $S_{dt}$ equals 9, thus y=−2.

It is obvious that the circle 11a will provide the same translational error data regardless of whether it is rotated around its center by rotational error.

The sensors of the four sensor arrays may take various forms suitable for sensing the ink in which the circle and spiral sections are printed. For example, each sensor may comprise a magnetized air gap. If magnetic ink is placed across a gap the magnetic flux in the gap will increase and this increase in flux can be sensed to indicate the presence of the circle or spiral sections. This and other types of sensors are described in detail in a co-pending application of the present inventor entitled, INTERACTIVE MAP INFORMATION EXCHANGE SYSTEM, Ser. No. 360,272, filed Mar. 22, 1982.

Figure 3:
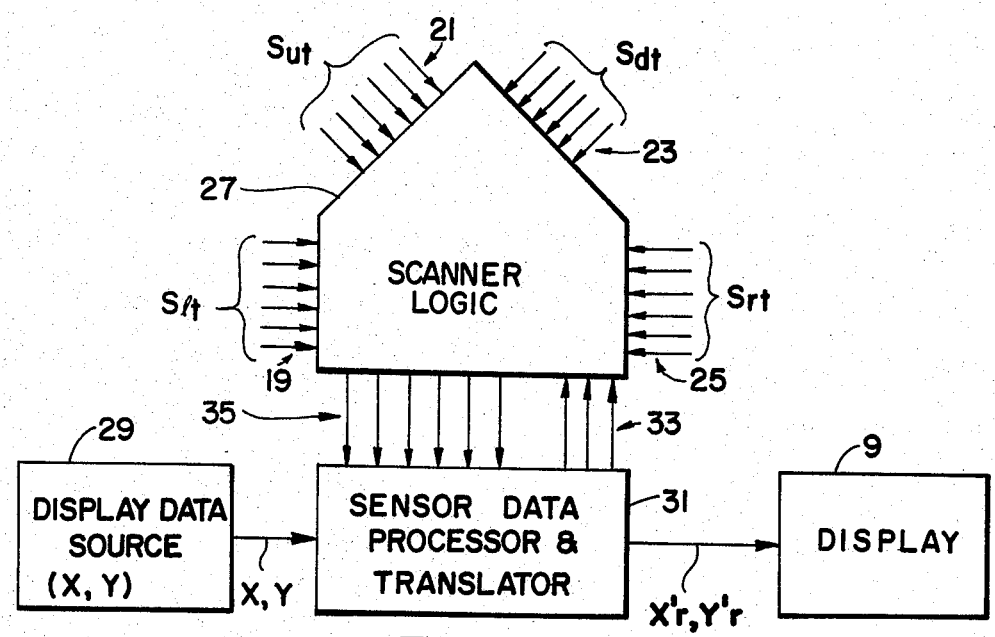
FIG. 3 shows a block diagram of novel circuitry for use in practicing this invention.

The block diagram of FIG. 3 shows in schematic form circuitry which can be used to automatically scan the sensor arrays to determine the points at which the map circle and the map spiral sections intercept the arrays. Circuitry is also provided for receiving information to be electronically displayed in the form of formatted words which include a coded representation of the symbols to be displayed together with the proper coordinates thereof, x and y, referenced to the extended x and y axes of the display, as illustrated in FIGS. 1 and 2. The circuitry calculates the map misalignment from the four sensor array outputs and determines translational and rotational error in accordance with the aforementioned relationships. This information is then used to translate the symbol coordinates x and y into another coordinate system having its origin displaced from the origin of the x and y axes by the amount of the calculated translational error and its axes rotated around the new origin by the amount of the rotational error. These new coordinates, $x_r'$ and $y_r'$ are then applied to the display so that the translated locations of the symbols will register with the misaligned map.

The circuitry of FIG. 3 includes scanner logic 27 to which all of the sensor arrays, $S_{lt}$, $S_{ut}$, $S_{dt}$, and $S_{rt}$ are connected. Each of the sensors of these arrays are connected in parallel to the scanner logic as indicated by the leads 19, 21, 23, and 25. The drawing indicates six leads or six sensors per array, however in practice several times this number of sensors would be necessary. Each of these sensor output leads will have a binary 1 thereon if the particular sensor is over the printed circle or spiral section and will have a binary 0 thereon if not so located. The scanner logic circuit 27 would have suitable circuitry to systematically sample or scan all of the sensor array outputs to determine the state of the signals thereon and thus determine the circle and spiral intercepts. This circuitry may comprise for example one or more shift registers having a number of stages equal to the number of sensors in each of the four sensor arrays. A binary 1 can be stepped along the shift register stages and recirculated therein in synchronism with the clock of the sensor arrays. An array of AND gates has one input connected to each sensor output and another to the corresponding shift register stage. The AND gate output thus indicates the binary states of the sensor arrays. The scanner logic thus scans each of the arrays in sequence and applies the scanned outputs in sequence to sensor data processor and translator circuit 31 over leads 35, equal in number to the number of sensors per array. The operation of the scanner logic is controlled from circuit 31 by means of three leads 33 which can for example include an initialize or reset signal, a synchronize or clock signal, and an activate or start signal. The system is activated by a single switch and is automatically synchronized and continues in a periodic scan mode until turned off. It can be arranged to automatically turn itself off if the required number of sensors are not actuated.

The display data source 29 of FIG. 3 may be a dedicated memory which is periodically scanned to update the display. Circuit 29 produces a formatted word for each symbol to be displayed. One portion of each word is a code representing the symbol and another portion the coordinates thereof, $x_o$ and $y_o$, referenced to the extended x and y axes of the display, as illustrated in FIGS. 1 and 2. The circuit 31 utilizes the signals on leads 35 to calculate the translational and rotational error and also translates the symbol coordinates from circuit 29 to new values in accordance with the misaligned map position. The symbols are then applied to display 9 in the proper positions to register with the misaligned map.

Figure 4:
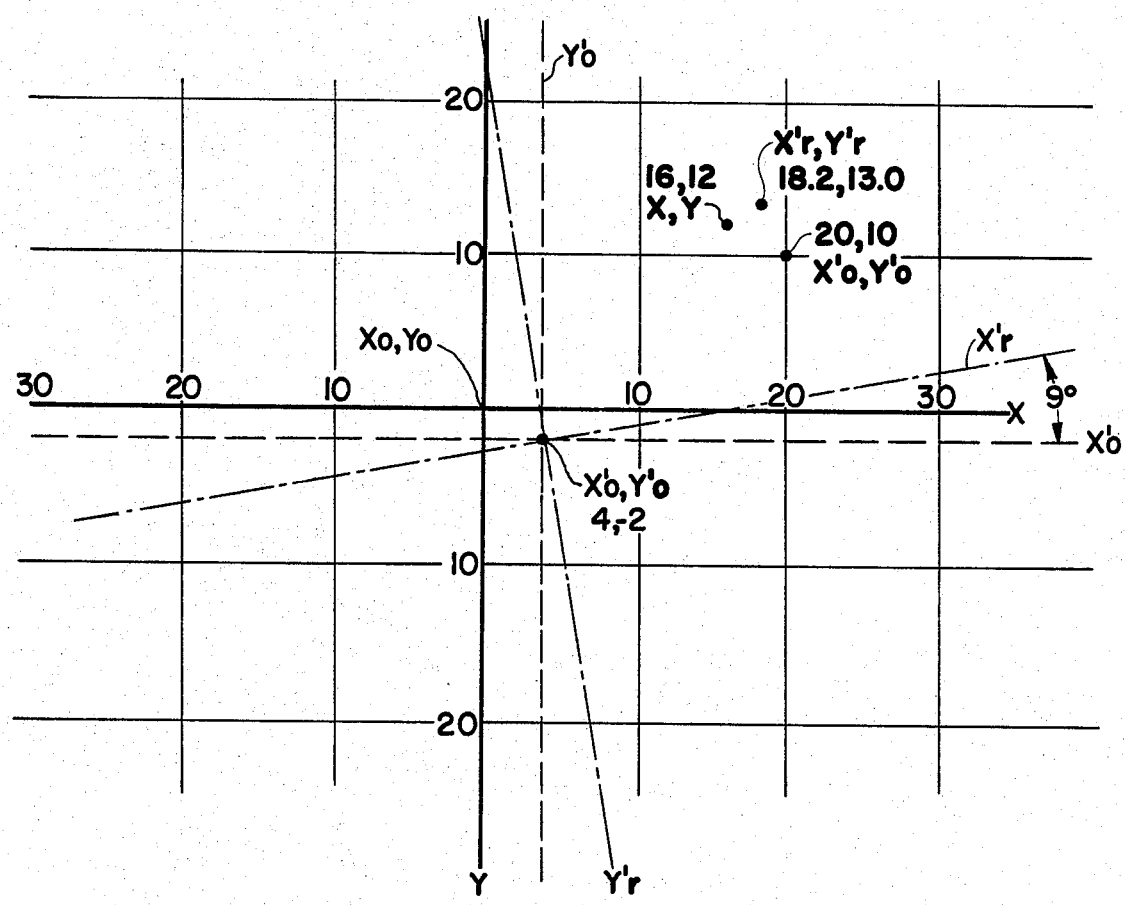
FIG. 4 illustrates how the aforementioned errors can be used to translate display symbol positions.

FIG. 4 illustrates how a symbol location can be translated. The x and y axes therein represent the extended axes of the display as illustrated in FIGS. 1 and 2. It is assumed that the map is misaligned in translation to coordinates x=4 and y=−2, as shown in FIG. 2. Assume that the display data circuit 29 indicates that a given symbol is to be located at original display coordinates of x=16 and y=12. This point is shown in FIG. 4 referenced to the orignal coordinates x and y. The dashed line coordinate system $x_o'$ and $y_o'$ represents the original system translated to compensate for the aforementioned translational error. The original coordinates of x=16 and y=12 can be referenced to this translated system by adding 4 to the x coordinate to yield $x_o'=20$ and subtract 2 from the original y coordinate to obtain $y_o'=10$. This point is also plotted in FIG. 4. Assume that the map has a rotational error or misalignment of 9° in the counterclockwise direction. Thus the final coordinate system will have its origin at points x=4 and y=−2 and be rotated 9° counterclockwise. Such a system is shown in FIG. 4 as dashed-dotted system labelled $x_r'$ and $y_r'$ to indicate both translation and rotation.

If $\theta$ is the rotational error, it can be seen from triginometry that the final translated and rotated coordinates will be;

$$x_r' = x'\cos\theta - y'\sin\theta \quad \text{Eq. (3)}$$

and $$y_r' = x'\sin\theta + y'\cos\theta \quad \text{Eq. (4)}$$

The angle $\theta$ can be calculated from the array sensor data as follows:

$$\theta = \frac{X_R - X_L}{2} \quad \text{Eq. (5)}$$

wherein positive values of $\theta$ indicate counterclockwise rotation and negative values clockwise rotation, and wherein $X_R$ and $X_L$ equals the number of sensors between the spiral sections and the circles, as explained above. This relationship assumes that the number of sensors $X_R$ and $X_L$ increases or decreases by one for each degree of rotational error.

In this example, using Eq. (3), (4) and (5) the final corrected coordinates of the illustrative symbol location will be $x_r'=18.2$ and $y_r'=13.0$. This point is plotted on FIG. 4. The symbol would be located at this point on display 9.

The spacing between the sensors of the four sensor arrays and the thickness of the printed lines forming the circle and spiral sections on the map would be chosen so that only one of the sensors could be activated by an adjacent line. For example, the width of the sensors could be made equal to the line thickness with the space between sensors slightly less than the line thickness. With this arrangement, the line would intercept only one sensor, except when the line is exactly halfway between adjacent sensors. The sensor circuitry would include two-state flip-flop devices which would switch to one state when the printed line is sensed. The sensor circuits could be interconnected so that the first of two adjacent sensors to switch "on" would lock out the other sensor. Thus if the map were placed over the display with a printed line halfway between two adjacent sensors, either one or the other would be activated, but not both.

While the invention has been illustrated by means of illustrative embodiments, obvious variations therein will occur to those skilled in the art, accordingly the invention should be limited only by the scope of the appended claims.

I claim:

1. Apparatus for automatically aligning an overlay map with an underlying electronic display, comprising, wide margins on said map on which are printed a circle concentric with the map's center and in machine-readable ink, said margins also having printed in the same type of ink a pair of mirror-image spirals of Archimedes, four arrays of sensors capable of sensing said ink located along the extended x and y axes of said electronic display, said spirals being located in the vicinity of the positive and negative x-axes of said display, scanning means adapted to scan said arrays of sensors to determine the intercepts of said circle and said spirals with said sensor arrays, circuit means for calculating the translational and rotational error of said map and said display from said intercepts, and further circuit means for shifting the position of said electronic display so that said map and display register with each other.

2. The apparatus of claim 1 further comprising a display data source in which coded words representing symbols to be applied to said display together with the coded locations thereof on said display are stored, and in which said further circuit means comprise means to translate said coded locations in accordance with said translational and rotational error, and means to apply the translated coded locations of said symbols to said display.

3. A method of achieving registration of an overlay map or the like with an underlying display comprising the steps of: placing said map or the like over said display in approximate alignment therewith; sensing the amount of translational and rotational error in the position of said map or the like relative to said display, said step of sensing said errors being accomplished by means of a circle printed on the underside and in the border of said map and a pair of sections of two similar spirals of Archimedes printed adjacent diametrically opposed points of said circle, one of said spirals being a clockwise spiral and the other being a counterclockwise spiral, and sensor arrays fixedly supported along the extended x and y axes of said display for sensing the position of said circle and spiral sections reltive to said x and y axes; and then electronically shifting said electronic display to compensate for said translational and rotational errors.

4. Apparatus for automatically aligning an overlay map or the like and an electronic display comprising first means to sense the misalignment of said map or the like in both translation and rotation and to derive error signals related thereto, said first means comprising a circle and a pair of mirror-image Archimedean spiral sections printed in machine-readable ink on the margin of said map or the like and arrays of sensors along the extended x and y axes of said display whereby the intercepts of said circle and spiral sections may be determined by said arrays of sensors; circuitry for generating said display; and second means to apply said error signals to said circuitry to align the display with the said misaligned map or the like.

5. Apparatus for automatically aligning an overlay map or the like and underlying display, comprising, a circle printed in machine-readable form in the said map or the like, and means to determine the error in translation between said map or the like by determining the center of said circle relative to the center of said display, and a pair of mirror-image spiral sections also printed in said form adjacent said circle at diametrically opposed areas thereof, and means to determine the rotational misalignment of said map or the like and said display by measuring the ratio of the distances between said spirals and said circle along a line fixed relative to said display.

6. The apparatus of claim 5 further including means to electronically shift the position of said display in accordance with said translational and rotational errors so that the two will register with each other.

* * * * *